(12) United States Patent
Atkinson et al.

(10) Patent No.: US 7,177,847 B2
(45) Date of Patent: Feb. 13, 2007

(54) AUTHORIZATION TOKEN ACCOMPANYING REQUEST AND INCLUDING CONSTRAINT TIED TO REQUEST

(75) Inventors: Robert George Atkinson, Woodinville, WA (US); Marc Levy, Woodinville, WA (US); James Utzschneider, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 10/272,129

(22) Filed: Oct. 15, 2002

(65) Prior Publication Data

US 2004/0073518 A1 Apr. 15, 2004

(51) Int. Cl.
*H04L 9/00* (2006.01)
*H04K 1/00* (2006.01)

(52) U.S. Cl. .......................................... 705/65; 713/156
(58) Field of Classification Search ............ 705/26–27, 705/39, 44, 50–55, 64–67, 71–78; 713/155–159, 713/168–180, 182–185; 380/28–30, 277–284; 707/9; 726/1–10
See application file for complete search history.

(56) References Cited

U.S. PATENT DOCUMENTS

| | | | | |
|---|---|---|---|---|
| 5,659,616 | A * | 8/1997 | Sudia | 705/76 |
| 6,260,024 | B1 * | 7/2001 | Shkedy | 705/37 |
| 6,308,266 | B1 * | 10/2001 | Freeman | 713/156 |
| 6,477,513 | B1 * | 11/2002 | Walker et al. | 705/76 |
| 2002/0107811 | A1 * | 8/2002 | Jain et al. | 705/64 |
| 2003/0074271 | A1 * | 4/2003 | Viswanath et al. | 705/26 |
| 2003/0074273 | A1 * | 4/2003 | Miller et al. | 705/26 |
| 2003/0083949 | A1 * | 5/2003 | Kar | 705/26 |
| 2004/0034774 | A1 * | 2/2004 | Le Saint | 713/169 |

FOREIGN PATENT DOCUMENTS

JP  2003122925 A  *  4/2003

OTHER PUBLICATIONS

Hillison et al., "Electronic Signatures and Encryption", CPA Journal, v71n8, pp. 20-25, Aug. 2001, ISSN: 0732-8435.*
Haavik, S. "Building a demand-driven vendor-managed supply chain [hospitals]", *Healthcare Financial Management*, 2000, 52(2), 56-57, 59-61.
Lau, H.C.W. et al., "Methodology for monitoring supply chain performance: a fuzzy logic approach", *Logistics Information Management*, 2002, 15(4), 271-280.

* cited by examiner

*Primary Examiner*—Mary D. Cheung
(74) *Attorney, Agent, or Firm*—Woodcock Washburn LLP

(57) ABSTRACT

A business relationship is effectuated between a first party and a second party and is governed by an agreement between the first party and the second party. The first party creates a token that authorizes a delegate to request a transaction according to the agreement on behalf of the first party, specifies in the token at least one constraint on a transaction requested by the delegate on behalf of the first party, and provides the token to the delegate. The delegate sends to the second party the token and a transaction document requesting a transaction according to the agreement. The second party applies each constraint in the token against the transaction document to determine whether the transaction document satisfies each constraint. If so, the transaction document is accepted for fulfillment.

20 Claims, 5 Drawing Sheets

AUTHORIZATION TOKEN ACCOMPANYING REQUEST AND INCLUDING CONSTRAINT TIED TO REQUEST

TECHNICAL FIELD

The present invention relates to an authorization system wherein a requester transmits a request to a requestee along with an authorization token that vouches for the requestor. More specifically, the present invention relates to such an authorization system wherein the authorization token includes at least one constraint relating to the request, and wherein the requestee honors the request if such request satisfies each constraint.

BACKGROUND OF THE INVENTION

Business-to-business (i.e., 'B2B') applications are employed to manifest relationships between businesses and the like. Such relationships are typically governed by agreements such as contracts and the like which, among other things, define the rules governing transactions between businesses (e.g. ordering, payment etc.). Typically, a transaction is effectuated by exchanging electronic documents between parties, where the documents are representative of the transaction and are formatted according to a predefined protocol. Such protocol for example describes document formats, requirements, constraints, and the like.

In one typical B2B application, a supplier allows for the purchase of supplies by way of an automated purchase order (PO) entry system arranged to receive a PO from a customer, where the customer is physically remote from the supplier but able to access the supplier electronically, such as for example by way of a network such as the Internet. In particular, the supplier and the customer contractually arrange that the customer can purchase by way of an electronic PO transaction supplies from the supplier by way of the entry system, usually based on a pre-arranged line of credit. The PO is typically submitted to the supplier as an electronic document from the customer, and may be accompanied by a digital signature or the like to vouch that the PO is legitimate. The received signature is of a form recognizable to the supplier, identifies the customer, and is reviewed by the supplier (i.e., by the entry system of the supplier) to in fact establish whether the PO is legitimate. The supplier may confirm the PO by way of sending a corresponding electronic document to the customer, and may proceed to fulfill the PO.

As is known, the signature of the customer is based on a private key (PR-1) from a public key—private key pair established for the customer, and the corresponding public key (PU-1) of the user is in the possession of the supplier. Thus, the supplier (i.e., the entry system of the supplier) in receipt of the PO applies PU-1 to the signature to verify same. Public key—private key pairs and encryption are generally known and need not be described herein in any detail.

Owing to the fact that a relatively large customer may have several actual users of the PO entry system, and that the customer may not want to hand out PR-1 to each user, an arrangement has been devised wherein the customer gives each user a delegation document authorizing the user to execute a PO on behalf of the customer (i.e., 'an authorization token'). In the arrangement, the authorization token includes a signature based on PR-1, and also includes a public key (PU-2) of the user from a public key—private key pair established for the user. In addition, in the arrangement, each PO submitted to the supplier by the user is accompanied by a digital signature based on the corresponding private key (PR-2) of the user.

Accordingly, the supplier (i.e., the entry system of the supplier) in receipt of the PO and authorization token from the user and still in possession of PU-1 applies same to the signature of the authorization token to verify same, obtains PU-2 from the authorization token, and applies same to the signature of the PO to verify same. Based on verification of both the authorization token and the PO, then, the supplier may then proceed to fulfill the PO.

However, an issue arises in that the authorization token as issued to the user essentially provides the user with the unlimited ability to submit POs, subject perhaps to any contractual limitations between the customer and the supplier. Thus, if a customer and a supplier do not contractually specify a maximum monetary value for each PO, a user in possession of an authorization token from the customer may in fact submit without constraint a PO having an inordinate monetary value. Correspondingly, if a customer and a supplier contractually specify a maximum monetary value for each PO that is relatively high, a user in possession of an authorization token from the customer may in fact submit a PO having the maximum monetary value, even if the user should not ordinarily have such a capability.

Accordingly, a need exists for a mechanism for applying monetary constraints to a user having an authorization token in the course of the user submitting a PO to a supplier based on the authorization token. More generally, a need exists for a mechanism for applying constraints both monetary and non-monetary to a user having an authorization token in the course of the user submitting a PO to a supplier based on the authorization token.

SUMMARY OF THE INVENTION

The aforementioned need is satisfied by the present invention in which a business relationship is effectuated between a first party and a second party. The relationship is governed by an agreement between the first party and the second party, and the first party creates a token that authorizes a delegate to request a transaction according to the agreement on behalf of the first party. The first party specifies in the token at least one constraint on a transaction requested by the delegate on behalf of the first party, and provides to the delegate the token. The delegate sends to the second party the token and a transaction document requesting a transaction according to the agreement.

The second party receives the transaction document and the token, and applies each constraint in the token against the transaction document to determine whether the transaction document satisfies each constraint. The transaction document is accepted for fulfillment only if the transaction document in fact satisfies each constraint.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
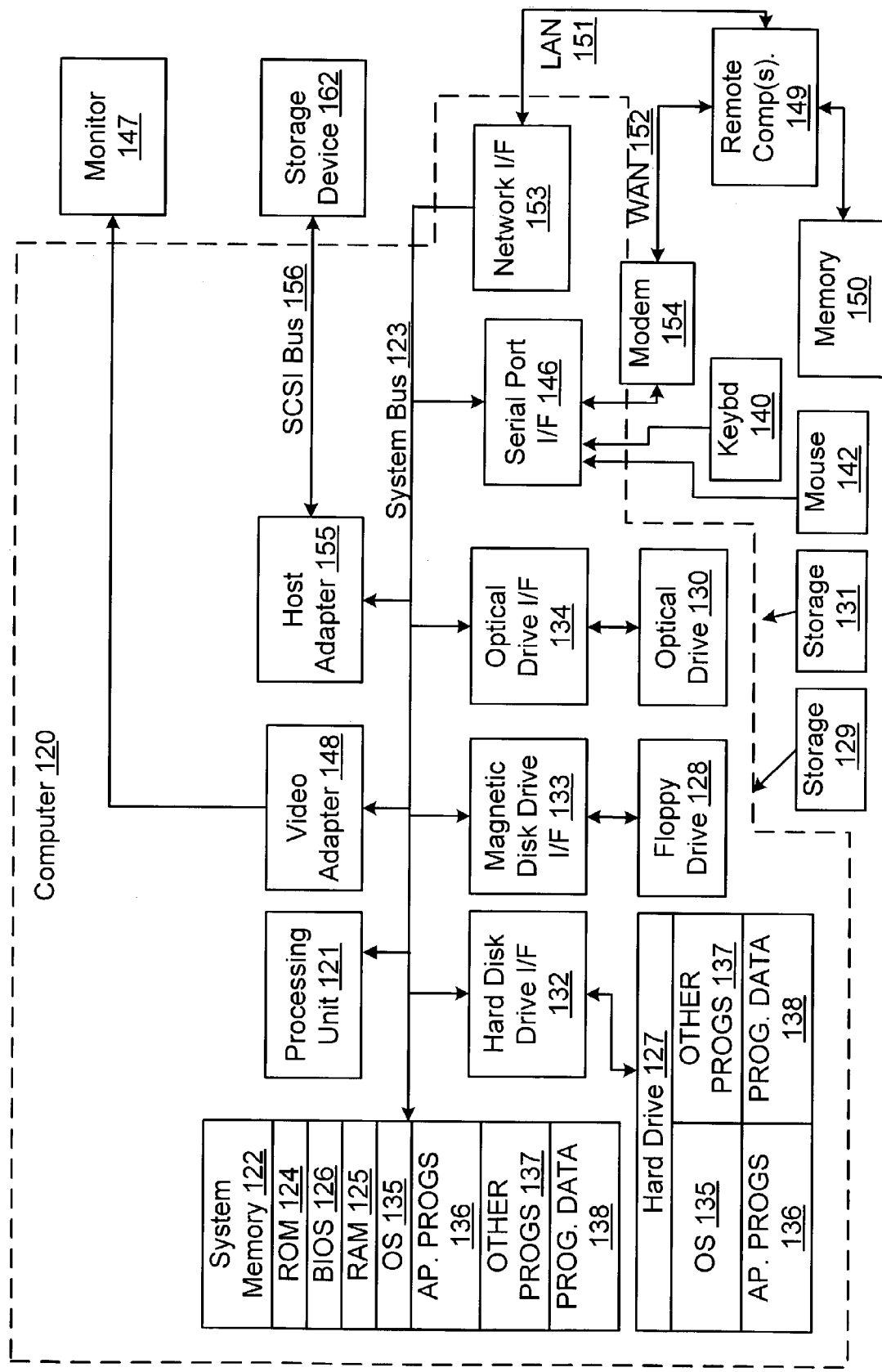
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a customer workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, mini-computers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

As was discussed above, and referring now to FIG. 2, in a typical Business-to-business (i.e., 'B2B') application or system 10 such as that of the present invention, a first party 12 and a second party 14 enter into a relationship governed by an agreement such as a contract 16 or the like. The contract 16 defines the rules governing transactions between the first party 12 and second party 14, and such rules may be any appropriate rules without departing from the spirit and scope of the present invention. For example, in the case where the application 10 is a purchase order (PO) application, the first party 12 is a customer that submits POs, and the second party 14 is a supplier that receives POs for fulfillment, the rules may define limits on the monetary value of a PO, how payment for a PO is to be made, and how confirmation of a PO is to be made, among other things.

Typically, the supplier 14 operates and maintains or arranges to have operated and maintained an automated purchase order (PO) entry system 18 to receive a PO submitted by a customer 12, where the customer may be physically remote from the supplier but able to access the supplier electronically, such as for example by way of a network such as the Internet. Of course, any other communications medium may be employed without departing from the spirit and scope of the present invention. Note that although the present invention is discussed principally in terms of a PO application 10, the present invention may also be embodied as other types of applications 10 without departing from the spirit and scope of the present invention.

In the PO application 10, and as may be appreciated, each PO transaction is effectuated by exchanging electronic documents 20 between the customer 12 and the PO entry system 18 of the supplier 14, where the documents 18 are representative of the transaction. Such documents 20 are of course formatted according to a predefined protocol, and include for example a PO submission document 20 from the customer 12 that represents the submitted PO and a confirmation document 20 from the supplier 14 that confirms receipt of the PO document 20. Any appropriate protocol may be employed without departing from the spirit and scope of the present invention. The PO document 20 in particular includes a digital signature 22 or the like to vouch that the PO document 20 is legitimate and should be honored by the entry system 18 for fulfillment by the supplier 14. Such digital signature 22 is preferably based on the private key of the sender of the PO document 20, and is therefore verifiable based on the corresponding public key.

Figure 2:
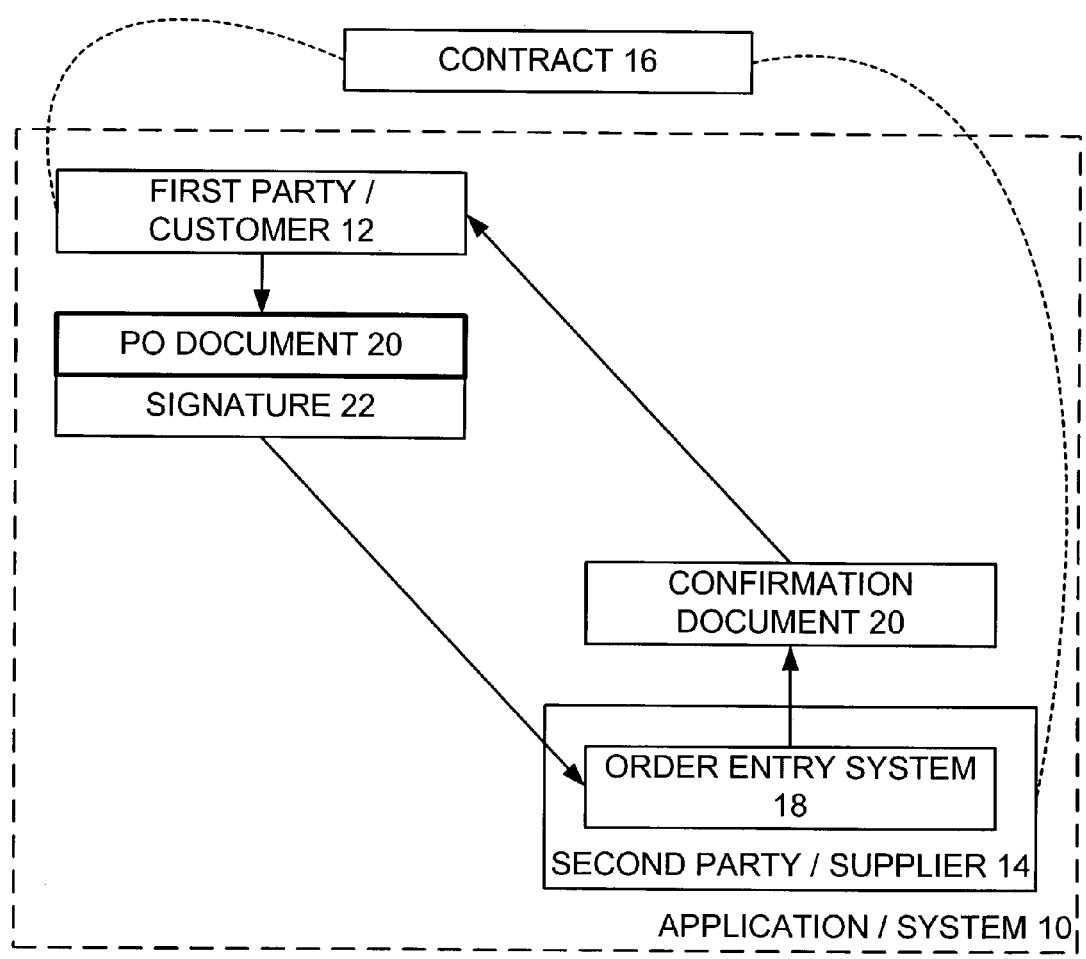
FIG. 2 is a block diagram showing an application or system wherein a first party exchanges business transaction documents with a second party.
Figure 3:
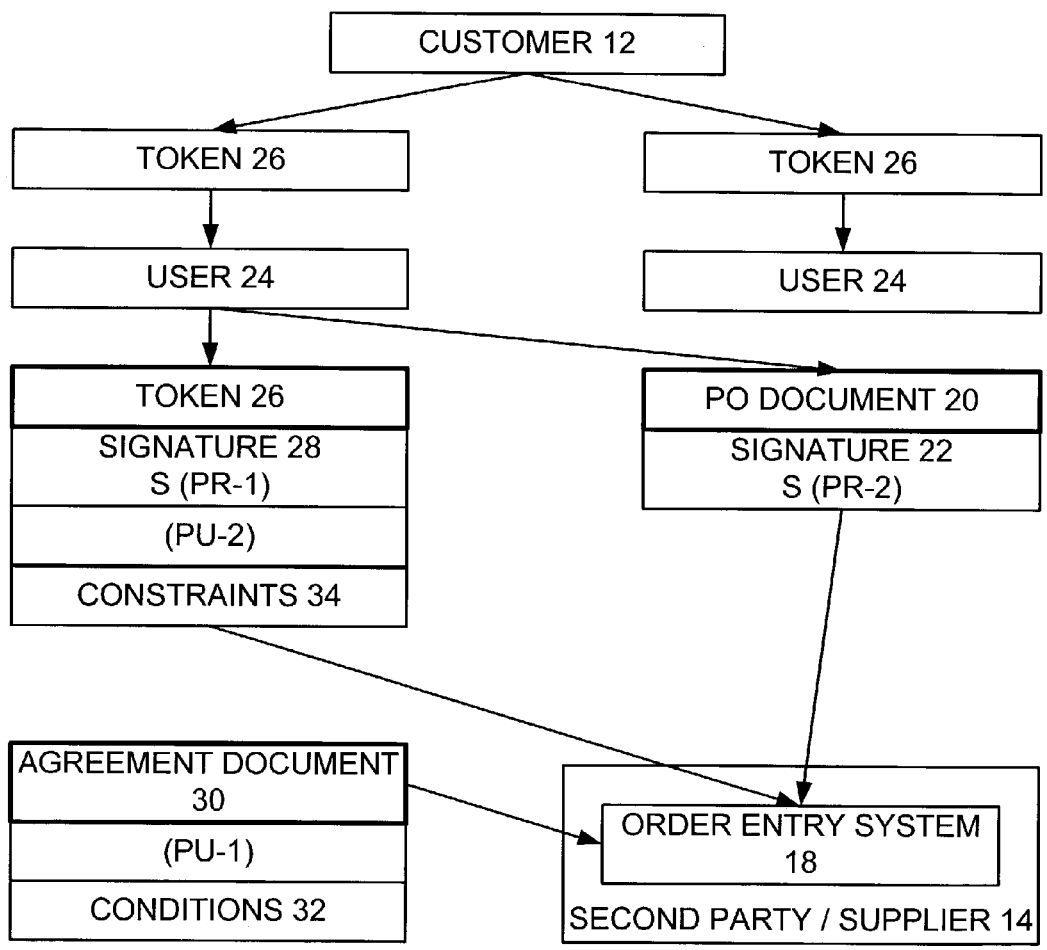
FIG. 3 is a block diagram showing a user submitting a purchase order (PO) and token to a supplier on behalf of a customer, where the token includes constraints to be applied against the PO by the supplier in accordance with one embodiment of the present invention.

Referring now to FIG. 3, in addition, in the case where the customer 12 includes several actual users 24 of the entry system 18, the customer 12 may directly provide each of at least some of the users 24 (i.e., 'delegates') with a delegation document or 'authorization token' 26 that authorizes the user to execute a PO (i.e., 'transaction document') on behalf of the customer 12, and a user 24 submitting a PO document 20 with a signature 22 (FIG. 2) also includes the authorization token 26 of such user 24.

In one embodiment of the present invention, the authorization token 26 includes a digital signature 28 or the like to vouch that the authorization token 26 is legitimate and should be honored. In particular, a public key—private key pair (PU-1, PR-1) is established for the customer 12, and the signature 28 of the authorization token as provided by the customer 12 to the user 24 is based on PR-1 (i.e., S(PR-1)). In addition, a public key—private key pair (PU-2, PR-2) is established for the user 24, and the signature 22 included with the PO document 20 as submitted by the user 24 is based on PR-2 (i.e., S(PR-2)). Further, the authorization token 26 as provided by the customer 12 to the user 24 includes PU-2. Also, the customer 12 provides the supplier 14 with PU-1 as part of the relationship therebetween (PU-1 is stored in agreement document 30, as disclosed in more detail below). Note that public key—private key pairs and signature creation and verification based thereon are generally known and need not be described herein in any detail.

Accordingly, the supplier 14 (i.e., the entry system 18 of the supplier 14) receives the submitted PO document 20 and accompanying authorization token 26 from the user 24, and applies PU-1 to the signature 28 of the authorization token 26 (S(PR-1)) to verify that the authorization token 26 was indeed provided by the customer 12. The supplier 14 therefore concludes that the user 24 is authorized by the customer 12 to submit the PO document 20 based on the relationship between the customer 12 and the supplier 14.

The supplier 14 also obtains PU-2 from the authorization token 26, and applies PU-2 to the signature 22 of the PO document 20 (S(PR-2)) to verify that the PO document 20 was indeed provided by the user 24. Accordingly, the supplier 14 concludes that the submitted PO document 20 is verified as having in fact come from the customer 12 by way of an authorized delegate (user 24) of such customer 12, and the PO document 20 may be further processed as appropriate for fulfillment according to the relationship between the customer 12 and the supplier 14.

Figure 4:
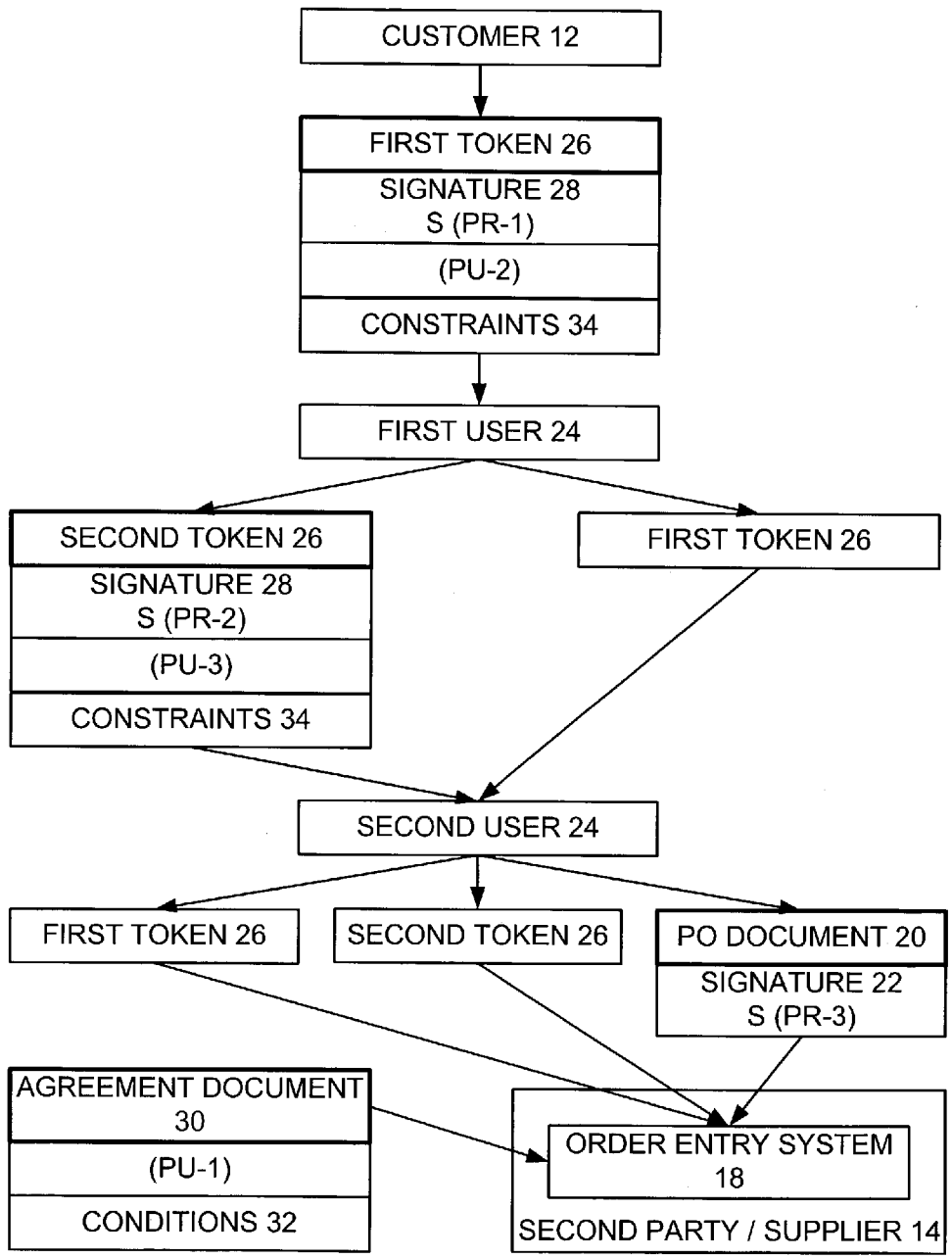
FIG. 4 is a block diagram showing a user submitting a PO and a chain of tokens to a supplier on behalf of a customer, where each token includes constraints to be applied against the PO by the supplier in accordance with one embodiment of the present invention.

Referring now to FIG. 4, it is to be noted that the user 24 may be empowered to delegate by issuing another authorization token 26 to another user 24, the another user may be empowered to delegate by issuing a further authorization token 26 to a further user 24, and so forth, thus forming a 'chain' of authorization tokens 26 (only two tokens 26 are shown in the chain of FIG. 4). In such case, each authorization token 26 in the chain as provided by A (a user 24 or the customer 12) to B (a user 24) includes a digital signature 28 or the like to vouch that the authorization token 26 is legitimate and should be honored, where the signature 28 of the authorization token 26 is based on PR-A) (i.e., S(PR-A)), and such authorization token 26 also includes PU-B. Further, any user 24 submitting a PO document 20 to the supplier 14 also submits each authorization token 26 in the chain between the user 24 and the customer 12.

Accordingly, the supplier 14 (i.e., the entry system 18 of the supplier 14) receives the submitted PO document 20 and the accompanying authorization tokens 26 from the user 24, applies PU-1 to the signature 28 of the authorization token 26 (S(PR-1)) from the customer 12 to verify same, obtains PU-2 from the authorization token 26, applies PU-2 to the signature 28 of the next authorization token 26 in the chain to verify same, obtains PU-3, etc. In doing so, the supplier 14 in effect goes through each authorization token 26 in the chain from the customer 14 to the user 24 actually submitting the PO document 20 and verifies all of such authorization tokens 26 in the chain. From such last authorization token 26 in the chain, then, the supplier 14 obtains the public key that will verify the PO document 20 itself, and in fact does verify same.

In one embodiment of the present invention, each document 20 exchanged between the supplier 14 (i.e., the entry system 18 of the supplier 14) and the customer 12 or a user 24 at the customer 12 is written in a language that allows for the precise description and execution of the kind of business transactions evoked in FIG. 2. For example, the documents 20 may be XML (extensible Mark-up Language) documents employing XLANG, a language underlying the orchestration feature of BIZTALK SERVER 2000 software, a product of MICROSOFT Corporation of Redmond, Wash., USA.

BIZTALK SERVER 2000 software enables the development and management of business processes within and between organizations. With such software, distributed business processes can be built to integrate applications and partners, as well as establish reliable, secure trading relationships with customers and key partners over the Internet. The XLANG language is hereby incorporated by reference in its entirety. Of course, any other appropriate language may be employed without departing from the spirit and scope of the present invention.

Assume now that the customer 12 and the supplier 14 have entered into an agreement or contract 16 under which the supplier 14 will fulfill POs (in the form of PO documents 20) submitted by the customer 12 and/or the users 24 of the customer 12, with the proviso that each have a monetary value less than a pre-determined amount X. To support the agreement 16 at the PO entry system 18 of the supplier 14 and also at any system employed by the customer 12, the customer 12 and the supplier 14 agree on a standard form for the PO documents 20 and other documents sent therebetween. In particular, the documents 20 must conform to a pre-defined PO schema. The customer 12 and the supplier 14 also agree that the customer 12 will sign each PO document or 'root' token 26 (i.e., the token 26 from the customer 12) with a private key (PR-1) and that the supplier 14 will be in possession of the corresponding public key (PR-1).

Under this agreement 16, the processing of a received PO document 20 from the customer 12 includes: verifying that the PO document 20 conforms to the PO schema; verifying that the PO monetary value is less than X; and verifying that the PO document 20 or root token 26 is signed by the private key (PR-1) of the customer 12.

In one embodiment of the present invention, each document 20 is examined by the entry system 18 of the supplier 14 according to programming that allows for interrogating the documents 20 and understanding the descriptions therein. For example, the interrogating programming may be written according to XPATH, a language for addressing parts of an XML document. The XPATH language is for example discussed in 'XML Path Language (XPATH) Version 1.0, Worldwide Web Consortium, November 1999 (James Clark & Steve DeRose, editors), currently available at http://www.w3.org/TR/xpath, hereby incorporated by reference in its entirety. Of course, any other appropriate interrogating language may be employed without departing from the spirit and scope of the present invention.

In one embodiment of the present invention, and as seen in FIGS. 3 and 4, the agreement 16 between the customer 12 and the supplier 14 is memorialized in the form of an agreement document 30, where the agreement document 30 includes stipulated agreement conditions 32 among other things. The conditions 32 must be constructed to express the actual agreement accurately, and to be understood by the entry system 18 of the supplier 14. A pseudo-example of at least the conditions 32 is as follows:

```
<DocumentStipulation>
    <AppliesTo DocumentType="uri"/>
    <Requirement xpath="xpath expression"/>*
    <SignedBy>
        <xmldsig:KeyInfo>...
    </SignedBy>
    <xmldsig:Signature>*
</DocumentStipulation>
```

<AppliesTo> refers to the document schema that this document stipulation applies to. In the present example this would refer to the PO schema as set forth in a convenient language such as XML. Each <Requirement> (note that there can be more than 1 as indicated informally by '*') identifies a condition that a submitted PO document 20 must satisfy. In the present example one condition would express that the PO monetary value be less than X. More concretely, an example XPATH expression might be '/po:PurchaseOrder/po:Total <10000', meaning that the contents of the Total element, which is a child of the PurchaseOrder element at the transaction document root, must be less than 10,000.

<SignedBy> identifies the signature that must sign all PO documents 20 submitted in connection with the agreement document 30. Each <xmldsig:Signature> element, of which there may be more than one, represents a signature relating to the agreement document 30, and may for example include the signature of the customer 12, the supplier 14, or the like.

With the agreement document 30 and a corresponding submitted PO document 20, the processing of the PO document 20 by the entry system 18 of the supplier 14 includes verifying the signature of the PO document 20, retrieving the agreement document 30, retrieving the conditions 32 from the agreement document 30, verifying that the PO document 20 satisfies each query in the conditions 32, and verifying that the key signing the PO document 20 or the key signing a root token 26 submitted with the PO document 20 is the one identified by the <SignedBy> element of the conditions 32.

Note that retrieving the agreement document 30 from a plurality of such agreement documents 30 may be achieved based on information obtained from the PO document 20. For example, the PO document 20 may include billing information that may be employed as a finder, or may explicitly refer to an agreement document 30. Whatever the mechanism, the legitimacy of the binding between the PO document 20 and the agreement document 30 is established by the match between the key signing the PO document 20 or root token 26 and the one identified by <SignedBy> in the PO agreement. In the case of a token 26, each token 26 in the chain must also be verified to establish legitimacy.

Note, too, that the above example of conditions 32 in an agreement document 30 does not specifically take into consideration that a user 24 with an authorization token 26 may be submitting a PO document 20. In particular, the conditions 32 in an agreement document 30 may be employed to require a statement granting authority to confer an authorization token 26. That is, the conditions 32 may specify not only a key that might directly sign a PO document 20 but also the format of the authorization token 26 and the key that must sign at least the root authorization token 26 (i.e., from the customer 12). Accordingly, an example of at least the conditions 32 of an agreement document 30, taking into consideration authorization tokens 26, is as follows:

```
<DocumentStipulation>
    <AppliesTo DocumentType="uri"/>
    <Requirement xpath="xpath"/>*
    <SignedBy>
        <xmldsig:KeyInfo>...
    </SignedBy>?
    <POAAuthority>
        <xmldsig:KeyInfo> ...
    </POAAuthority>?
    <xmldsig:Signature>*
</DocumentStipulation>
```

The elements common to the previous example are as before. Note that <SignedBy> has now become optional since the conditions 32 of the agreement document 30 now specify that a PO document 20 may be signed either by the authorized key (<SignedBy>) or subject to approval through an authorization token 26. <POAAuthority> defers further authorization to an authorization token 26 signed by the key identified in the enclosed <KeyInfo>. Note that a PO document 20 is still subject to the conditions or constraints expressed in the <Requirement> element(s).

As pointed out above, each authorization token 26 as issued to a user 24 essentially provides the user 24 with the unlimited ability to submit POs, subject of course to the conditions 32 in the corresponding agreement document 30. Thus, if a customer 12 and a supplier 14 contractually specify a maximum monetary value for each PO document 20, a user 24 in possession of an authorization token 26 from the customer 12 may in fact submit a PO document 20 having the maximum monetary value, even if the user 24 should not ordinarily have such a capability. Put another way, a user 24 ought to be restricted to submitting a PO document for a reasonable monetary value, which in many cases is much less than the maximum monetary value.

Accordingly, and as seen in FIGS. 3 and 4, in one embodiment of the present invention, the authorization token 26 allows expressing one or more constraints 34 on a PO document 20 submitted therewith and authorized thereby. In particular, in one embodiment of the present invention, the constraints 34 in the token 26 are to be applied against the PO document 20 by the entry system 18 of the supplier 14 prior to the supplier 14 accepting the PO document 20 for fulfillment. Accordingly, an example of such an authorization token 26 with constraints 34 is as follows:

```
<POA>
    <AppliesTo DocumentType="uri"/>
    <Requirement xpath="xpath"/>*
    <SignedBy>
        <xmldsig:KeyInfo>...
    </SignedBy>
    <xmldsig:Signature>*
    <Delegate? = [Yes/No] >
</POA>
```

As may be appreciated, the token 26 (i.e., 'Power of Attorney' or POA) confers signature authority for documents of type <DocumentType> (a PO document 20, e.g.) to the key identified by <SignedBy> provided that such documents satisfy the constraints 34 expressed by each <Requirement>. <Delegate?> may be employed to establish whether the user 24 having the token 26 is empowered to delegate to another user 24 by issuing a token 26 to the another user 24. Presumably, if the token 26 of a user 24 has <Delegate?> set to No, the user 24 cannot in fact issue such a token 26 to the another user 24. As set forth above, the validity of the token 26 is established by verifying that the signing key is in fact the one identified in the corresponding agreement document 30, or that the authorization token 26 is part of a chain of tokens 26 that lead to a root token 26 with a signing key that is identified in the corresponding agreement document 30.

Figure 5:
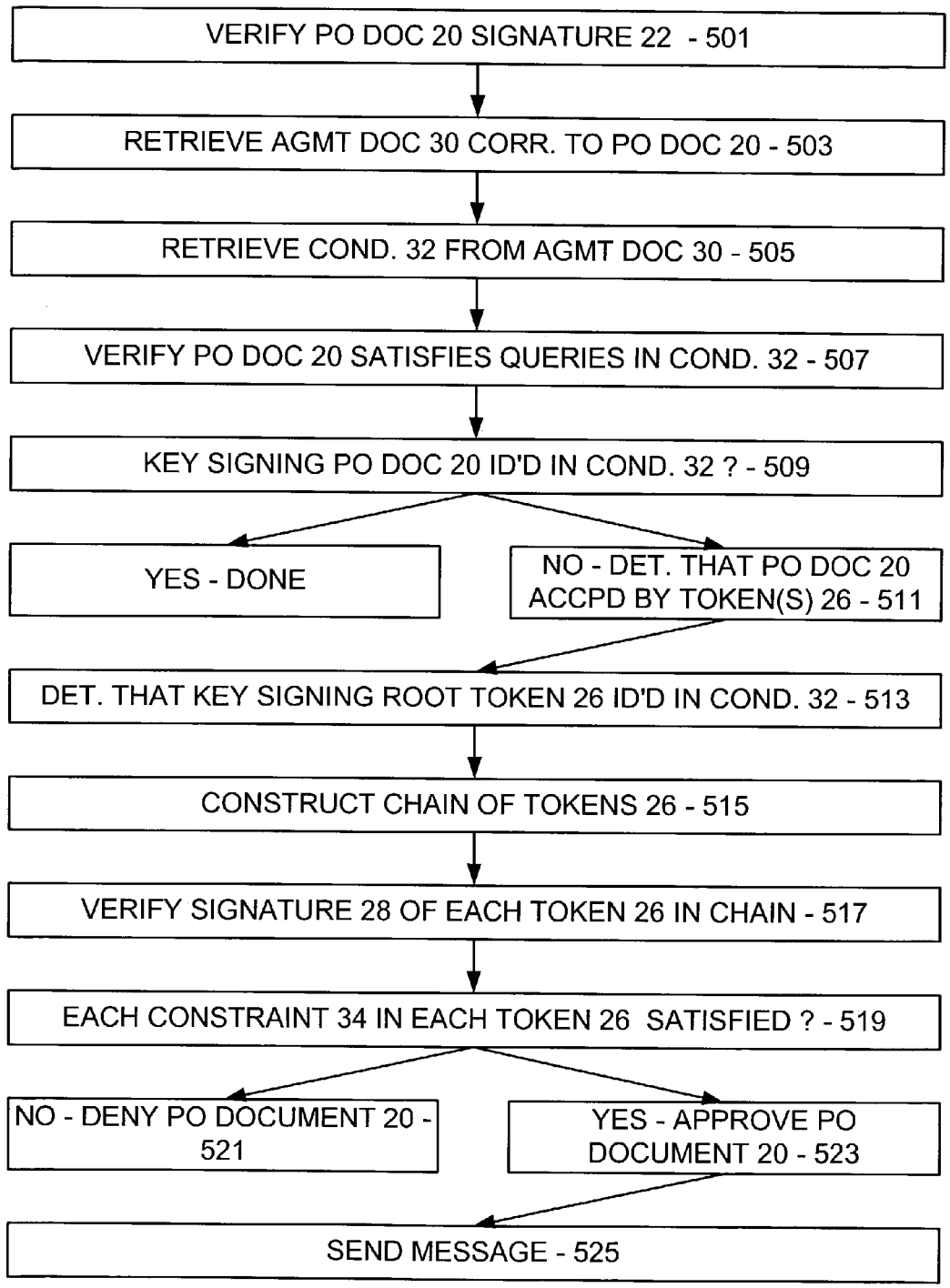
FIG. 5 is a flow chart showing steps performed by the supplier in verifying the received tokens and PO of FIG. 4 and applying the constraints of the tokens against the PO in accordance with one embodiment of the present invention.

Referring now to FIG. 5, then, when a user 24 or customer 12 submits a PO document 20 to an order entry system 18 of a supplier 14, the system 18 validates the submitted PO document 20 by:

1. verifying the signature 22 of the PO document 20 (step 501);
2. retrieving the agreement document 30 corresponding to the PO document 20 based for example on an appropriate reference to such agreement document 30 in such PO document 20 (step 503);
3. retrieving any conditions 32 from the agreement document 30 (step 505);
4. verifying that the PO document 20 satisfies each query in the conditions 32 (step 507); and
5. determining whether the key signing the PO document 20 is the one identified by the <SignedBy> element of the conditions 32 (step 509).

If the key signing the PO document 20 is the one identified by the <SignedBy> element of the conditions 32, then the PO document 20 is from the customer 12, and no further special action need be taken.

However, if the key signing the PO document 20 is different from that identified by the <SignedBy> element of the conditions 32, it must be determined whether the PO document 20 is accompanied by any authorization tokens 26 (step 511). Assuming this is the case, the system 18 continues validating the submitted PO document 20 by:

6. determining that one of the accompanying authorization tokens 26 is the root token 26 signed by the key identified by the <SignedBy> element of the conditions 32 (step 513);
7. constructing a chain of the tokens 26 from such root token 26 to the PO document 20 (step 515); and
8. verifying the signature 28 of each token 26 in the chain (step 517).

Thus, the legitimacy of the binding between the PO documents 20 and tokens 26 and the agreement document 30 is established.

In one embodiment of the present invention, each constraint 34 in each token 26 in the chain is applied to the PO document 20 to determine whether each constraint 34 in each token 26 as applied to the PO document 20 is satisfied (step 519). Importantly, if every constraint in every token 26 is not satisfied, the PO document 20 as submitted is denied by the entry system 18 (step 521). Correspondingly, if every constraint in every token 26 is satisfied, and assuming no other impediments exist, the PO document 20 as submitted is approved by the entry system 18 (step 523). Such denial or approval may be conveyed to the submitting user 24 by way of the confirmation document 20 (FIG. 2), an appropriate messaging system, or the like (step 525).

Note that by establishing authority to submit a PO document 20 by way of a chain of tokens 26, each token 26 may have constraints 34 therein. Moreover, at least some of the constraints 34 may have a common form but different values. For example, as between two tokens 26 in a chain, both may have a constraint 34 relating to total monetary value of the submitted PO document, while one such constraint 34 may specify that such total monetary value is no more than Y, while another such constraint 34 may specify that such total monetary value is no more than Z.

Generally, each token 26 may have any number of constraints 34 or no constraints 34 without departing from the spirit and scope of the present invention. As may be appreciated, the constraints 34 in a token 26 are specified by the grantor of such token 26 (i.e., the next user 24 in the chain toward the customer 12 or the customer 12 itself) in the course of creating such token 26. Creation of such token 26 including specifying the constraints 34 therein should be apparent to the relevant public and therefore need not be specified herein in any detail. Typically, the grantor employs appropriate software to in fact create such token 26.

A constraint 34 within a token 26 may be any appropriate constraints 34 without departing from the spirit and scope of the present invention, although it is to be appreciated that such constraint 34 is intended to be relevant to a feature of a PO document 20 submitted with the token 26. For example, a constraint 34 may specify a minimum or a maximum or even an exact value with regard to a feature of a submitted PO document 20 such as a total monetary value, a monetary value of a type of item, a total item count, an item count of a type of item, etc.

A grantor having a first token 26 and granting a second token 26 to a grantee need not necessarily specify a constraint 34 in the second token 26. As may be appreciated, since the second token 26 is part of a chain including the first token 26, the second token 26 implicitly includes the constraints 34 of the first token 26, as well as any other tokens 26 in the chain toward the customer 12. Typically, a grantor having a first token 24 and granting a second token 26 to a grantee specifies a constraint 34 in the second token 26 that is not less restrictive than any corresponding constraint 34 specified in the first token 24 or any constraint 34 implicitly part of the first token 24.

That is, if a first user 24 has a token 26 that specifies or is implicitly subject to a constraint 34 wherein the total monetary value of a submitted PO document 20 is less than X, if such first user 24 in turn grants a token 26 to a second user 24, and if in the course of granting the token 26 the first user chooses to specify a constraint 34 with regard to the total monetary value of a submitted PO document 20, the specified constraint should be that the total monetary value be less than Y, where Y is less than X. Note that the first user 24 need not be restricted to specifying the total monetary value be less than Y, where Y is less than X. However, should the first user in fact choose to specify that the total monetary value be less than Y, where Y is greater than X, such a constraint 34 would be meaningless in the face of the constraint 34 from the token 26 of the first user 24 that specifies that the total monetary value be less than X.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful mechanism for applying constraints 34 both monetary and non-monetary to a user 24 having an authorization token 26 in the course of the user 24 submitting a PO document 20 to a supplier 14 based on the authorization token 26. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A method of effectuating a business relationship between a first party and a second party, the relationship being governed by an agreement between the first party and the second party and being evidenced by the second party being in possession of a public key of the first party, the method comprising:
   creating by the first party a token that authorizes a delegate to request a transaction according to the agreement on behalf of the first party;
   specifying in the token at least one constraint on a transaction requested by the delegate on behalf of the first party;
   providing to the delegate the token; and
   sending by the delegate to the second party the token and a transaction document requesting a transaction according to the agreement,
   wherein the second party upon receiving the transaction document and the token from the delegate applies each constraint in the token against the transaction document to determine whether the transaction document satisfies each constraint and accepts the transaction document for fulfillment only if the transaction document in fact satisfies each constraint,
   wherein the transaction document is representative of and describes the transaction and conforms to a pre-defined schema such that the transaction document is interrogated and understood according to the pre-defined schema, and wherein the transaction document is an electronic document that includes a digital signature based on a private key of the delegate and is verified based on a corresponding public key,
   wherein the token is an electronic certificate that includes a digital signature based on a private key of the first party corresponding to the public key of the first party as possessed by the second party and is verified based on such public key of the first party, and
   wherein the token includes the public key of the delegate, whereby the second party as possessing the public key of the first party applies such public key of the first party to the signature of the token to verify such token, obtains the public key of the delegate from the token, and applies the obtained public key of the delegate to the signature of the transaction document to verify such transaction document.

2. The method of claim 1 comprising specifying a constraint relating to a monetary value of the transaction document.

3. The method of claim 1 wherein the first party is a customer, the delegate is an agent of the customer that submits a purchase order (PO) on behalf of the customer, and the second party is a supplier that receives the submitted PO for fulfillment.

4. The method of claim 1 organized into modules of computer-executable instructions and stored on a computer-readable medium.

5. A method of effectuating a business relationship between a first party and a second party, the relationship being governed by an agreement between the first party and the second party and being evidenced by the second party being in possession of a public key of the first party, the first party creating a token that authorizes a delegate to request a transaction according to the agreement on behalf of the first party, specifying in the token at least one constraint on a transaction requested by the delegate on behalf of the first party, and providing to the delegate the token, the delegate sending to the second party the token and a transaction document requesting a transaction according to the agreement, the method comprising:
   receiving by the second party the transaction document and the token;

applying each constraint in the token against the transaction document to determine whether the transaction document satisfies each constraint; and accepting the transaction document for fulfillment only if the transaction document in fact satisfies each constraint, wherein the transaction document is representative of and describes the transaction and conforms to a pre-defined schema such that the transaction document is interrogated and understood according to the pre-defined schema, and wherein the transaction document is an electronic document that includes a digital signature based on a private key of the delegate and is verified based on a corresponding public key, wherein the token is an electronic certificate that includes a digital signature based on a private key of the first party corresponding to the public key of the first party as possessed by the second party and is verified based on such public key of the first party, and wherein the token includes the public key of the delegate, the method further comprising, upon receiving the transaction document and token from the delegate;

applying the public key of the first party to the signature of the token to verify that the token was indeed provided by the first party to the delegate and to conclude that the delegate is authorized by the first party to submit the transaction document based on the agreement between the first party and the second party;

obtaining the public key of the delegate from the token;

applying the public key of the delegate to the signature of the transaction document to verify that the transaction document was indeed provided by the delegate and to conclude that the transaction document in fact comes from the first party by way of the delegate thereof; and processing the transaction document for fulfillment thereof according to the agreement between the first party and the second party upon verifying the token and the transaction document.

6. The method of claim 5 wherein the first party is a customer, the delegate is an agent of the customer that submits a purchase order (PO) on behalf of the customer, and the second party is a supplier that receives the submitted PO for fulfillment.

7. The method of claim 5 wherein the second party receives the transaction document and the token from the delegate by way of an automated entry system.

8. The method of claim 5 wherein the public key of the first party is stored by the second party as part of an agreement document memorializing the agreement governing transactions between the first party and the second party.

9. The method of claim 8 further comprising retrieving by the second party the agreement document from a plurality of agreement documents based on identifying indicia present in the transaction document.

10. The method of claim 5 organized into modules of computer-executable instructions and stored on a computer-readable medium.

11. A method of effectuating a business relationship between a first party and a second party, the relationship being governed by an agreement between the first party and the second party and being evidenced by the second party being in possession of a public key of the first party, the method comprising:

creating a chain of tokens between the first party and a delegate, each token being granted by a grantor to a grantee, each token authorizing the grantee to request a transaction according to the agreement on behalf of the first party, the token granted by the first party being a root token;

specifying in at least some of the tokens in the chain at least one constraint on a transaction requested by the delegate on behalf of the first party;

providing to the delegate each token in the chain; and sending by the delegate to the second party each token in the chain and a transaction document requesting a transaction according to the agreement, wherein the second party upon receiving the transaction document and each token in the chain from the delegate applies each constraint in each token in the chain against the transaction document to determine whether the transaction document satisfies each constraint in each token in the chain and accepts the transaction document for fulfillment only if the transaction document in fact satisfies each constraint in each token in the chains, wherein the transaction document is representative of and describes the transaction and conforms to a pre-defined schema such that the transaction document is interrogated and understood according to the pre-defined schema, and wherein the transaction document is an electronic document that includes a digital signature based on a private key of the delegate and is verified based on a corresponding public key, wherein each token in the chain is an electronic certificate that includes a digital signature based on a private key of the grantor and is verified based on a corresponding public key, and wherein each token includes the public key of the grantee, whereby the second party for each token in the chain obtains the public key of the grantor and applies same to the signature of the token to verify such token, and obtains the public key of the delegate from the token in the chain granted to the delegate and applies the obtained public key of the delegate to the signature of the transaction document to verify such transaction document.

12. The method of claim 11 comprising specifying a constraint relating to a monetary value of the transaction document.

13. The method of claim 11 wherein the first party is a customer, the delegate is an agent of the customer that submits a purchase order (PO) on behalf of the customer, and the second party is a supplier that receives the submitted PO for fulfillment.

14. The method of claim 11 organized into modules of computer-executable instructions and stored on a computer-readable medium.

15. A method of effectuating a business relationship between a first party and a second party, the relationship being governed by an agreement between the first party and the second party and being evidenced by the second party being in possession of a public key of the first party, a chain of tokens being created between the first party and a delegate, each token being granted by a grantor to a grantee, each token authorizing the grantee to request a transaction according to the agreement on behalf of the first party, the token granted by the first party being a root token, at least some of the tokens in the chain specifying at least one constraint on a transaction requested by the delegate on behalf of the first party, the delegate being provided with each token in the chain and sending to the second party each token in the chain and a transaction document requesting a transaction according to the agreement, the method comprising:

receiving by the second party the transaction document and each token in the chain;

applying each constraint in each token of the chain against the transaction document to determine whether the transaction document satisfies each constraint in each token of the chain; and accepting the transaction document for fulfillment only if the transaction document in fact satisfies each constraint in each token in the chain, wherein the transaction document is representative of and describes the transaction and conforms to a pre-defined schema such that the transaction document is interrogated and understood according to the pre-defined schema, and wherein the transaction document is an electronic document that includes a digital signature based on a private key of the delegate and is verified based on a corresponding public key, wherein each token in the chain is an electronic certificate that includes a digital signature based on a private key of the grantor and is verified based on a corresponding public key, and wherein each token includes the public key of the grantee, the method further comprising, upon receiving the transaction document and each token from the delegate, for each token in the chain:

obtaining the public key of the grantor and applying same to the signature of such token to verify such token;

obtaining the public key of the delegate from the token in the chain granted to the delegate and applying same to the signature of the transaction document to verify such transaction document; and processing the transaction document for fulfillment thereof according to the agreement between the first party and the second party upon verifying each token and the transaction document.

16. The method of claim 15 wherein the first party is a customer, the delegate is an agent of the customer that submits a purchase order (PO) on behalf of the customer, and the second party is a supplier that receives the submitted PO for fulfillment.

17. The method of claim 15 wherein the second party receives the transaction document and the token from the delegate by way of an automated entry system.

18. The method of claim 15 wherein the public key of the first party is stored by the second party as part of an agreement document memorializing the agreement governing transactions between the first party and the second party.

19. The method of claim 18 further comprising retrieving by the second party the agreement document from a plurality of agreement documents based on identifying indicia present in the transaction document.

20. The method of claim 15 organized into modules of computer-executable instructions and stored on a computer-readable medium.

* * * * *